(12) United States Patent
Marinello et al.

(10) Patent No.: US 10,429,119 B2
(45) Date of Patent: Oct. 1, 2019

(54) REFRIGERATED COMPARTMENT AIR DISTRIBUTION ASSEMBLY

(71) Applicant: WHIRLPOOL CORPORATION, Benton Harbor, MI (US)

(72) Inventors: Giulia Marinello, Benton Harbor, MI (US); Sanjesh Kumar Pathak, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/547,665

(22) PCT Filed: Jul. 6, 2016

(86) PCT No.: PCT/US2016/041132
§ 371 (c)(1),
(2) Date: Jul. 31, 2017

(87) PCT Pub. No.: WO2018/009185
PCT Pub. Date: Jan. 11, 2018

(65) Prior Publication Data
US 2018/0231296 A1   Aug. 16, 2018

(51) Int. Cl.
*F25D 17/06* (2006.01)
*F25D 11/02* (2006.01)
*F25D 21/04* (2006.01)
*F25D 23/06* (2006.01)
(Continued)

(52) U.S. Cl.
CPC ............ *F25D 17/065* (2013.01); *F25D 11/02* (2013.01); *F25D 17/067* (2013.01); *F25D 21/04* (2013.01);
(Continued)

(58) Field of Classification Search
CPC .... F25D 17/065; F25D 23/087; F25D 23/028; F25D 17/067; F25D 11/02; F25D 23/066;
(Continued)

(56) References Cited

U.S. PATENT DOCUMENTS 2,795,691 A * 6/1957 Solley, Jr. ............... F25D 27/00
200/61.83
3,270,519 A * 9/1966 Pohl, Jr. .................... F25C 1/24
62/300
(Continued)

FOREIGN PATENT DOCUMENTS

EP          1426711 B1     6/2015

*Primary Examiner* — Ljiljana V. Ciric
(74) *Attorney, Agent, or Firm* — Price Heneveld LLP (57) ABSTRACT

The refrigeration appliance includes a wrapper forming an exterior of the refrigeration appliance and a refrigeration compartment liner and a freezer compartment liner within the wrapper. The wrapper, the refrigeration compartment liner, and the freezer compartment liner are in a spaced apart configuration forming a refrigeration compartment and a freezer compartment. A door is configured to provide access to and seal the freezer compartment. The door has a seal around a periphery thereof. A mullion is disposed between the refrigeration compartment liner and the freezer compartment liner. The mullion includes a forward portion extending towards the freezer compartment. The forward portion includes at least one air-deflection surface. A fan is operably coupled with an evaporator and is configured to direct cooled air within the freezer compartment. The fan is offset from the evaporator and configured to direct air at the air-deflection surface.

18 Claims, 7 Drawing Sheets

(51) Int. Cl.
*F25D 23/02* (2006.01)
*F25D 23/08* (2006.01)

(52) U.S. Cl.
CPC ......... *F25D 23/028* (2013.01); *F25D 23/066* (2013.01); *F25D 23/087* (2013.01); *F25D 2317/063* (2013.01); *F25D 2317/0683* (2013.01); *Y02B 40/34* (2013.01)

(58) Field of Classification Search
CPC ............. F25D 21/04; F25D 2317/0683; F25D 2317/063; Y02B 40/34
USPC .......................................................... 62/419
See application file for complete search history.

(56) References Cited

U.S. PATENT DOCUMENTS

| | | | | |
|---|---|---|---|---|
| 3,355,907 A * | 12/1967 | Simmons | ............. | F25D 17/065 62/229 |
| 3,455,119 A * | 7/1969 | Bright | ................. | F25D 17/065 62/180 |
| 4,239,518 A * | 12/1980 | Steelman | ............. | A47F 3/0408 62/282 |
| 4,944,157 A * | 7/1990 | Jenkins | ................. | F25D 17/065 62/407 |
| 5,784,895 A * | 7/1998 | Choi | ..................... | A47F 3/0447 62/256 |
| 5,897,181 A * | 4/1999 | Avendano | ............ | F25D 23/062 29/525.11 |
| 8,028,538 B2 * | 10/2011 | Kim | ....................... | F25D 17/065 62/187 |
| 2003/0090187 A1 * | 5/2003 | Kawamura | ........... | E05B 1/0015 312/401 |
| 2010/0018239 A1 | 1/2010 | Shin et al. | | |
| 2010/0071874 A1 * | 3/2010 | Nojima | ................. | F25D 17/065 165/61 |
| 2010/0218542 A1 * | 9/2010 | McCollough | ............ | F25C 5/22 62/345 |
| 2012/0085120 A1 * | 4/2012 | Davis | ..................... | F16J 15/064 62/340 |
| 2013/0086928 A1 | 4/2013 | Cho et al. | | |

* cited by examiner

REFRIGERATED COMPARTMENT AIR DISTRIBUTION ASSEMBLY

FIELD

The present disclosure generally relates to refrigerated appliances, and more particularly relates to freezer compartments of the refrigerated appliance having air distribution assemblies therein.

BACKGROUND

Refrigerated appliances commonly define one or more compartments therein that are accessible through a door. The door, in most instances, includes a seal there around. To maintain high efficiency of the appliance, the seal around the door should be airtight and condensation on the seal should be minimized.

SUMMARY

According to one aspect of the present disclosure, a refrigeration appliance is disclosed. The refrigeration appliance includes a wrapper forming an exterior of the refrigeration appliance. The refrigeration appliance further includes a refrigeration compartment liner and a freezer compartment liner. The wrapper, the refrigeration compartment liner, and the freezer compartment liner are in a spaced apart configuration forming a refrigeration compartment and a freezer compartment. A door is configured to provide access to and seal the freezer compartment. The door has a seal around a periphery thereof. A mullion is disposed between the refrigeration compartment liner and the freezer compartment liner. The mullion includes a forward portion extending towards the freezer compartment. The forward portion includes at least one air-deflection surface. A fan is operably coupled with an evaporator and is configured to direct cooled air within the freezer compartment. The fan is offset from the evaporator and configured to direct air at the air-deflection surface.

According to another aspect of the present disclosure, a freezer compartment for a refrigeration appliance is disclosed. The freezer compartment includes a wrapper forming an exterior of the refrigeration appliance. A liner is disposed in a spaced apart configuration from the wrapper. A door is configured to provide access to and seal the freezer compartment. A seal is disposed around a periphery of the door. A mullion is attached to the liner and includes a forward portion. The forward portion of the mullion includes at least one air-deflection surface. A fan is configured to direct cooled air within the freezer compartment. The fan is offset from an evaporator and is configured to direct air towards the air-deflection surface.

According to another aspect of the present disclosure, a refrigeration appliance is disclosed. The refrigeration appliance includes a wrapper forming an exterior of the refrigeration appliance. A liner is disposed in a spaced apart configuration from the wrapper and defines a compartment. A door is configured to provide access to and seal the compartment. A seal is disposed around a periphery of the door. At least one air-deflection surface extends inwardly of the seal and is configured to substantially redirect airflow from a fan. An axis of airflow from the fan is directed at the air-deflection surface.

These and other features, advantages, and objects of the present device will be further understood and appreciated by those skilled in the art upon studying the following specification, claims, and appended drawings.

DETAILED DESCRIPTION OF EMBODIMENTS

Figure 1:
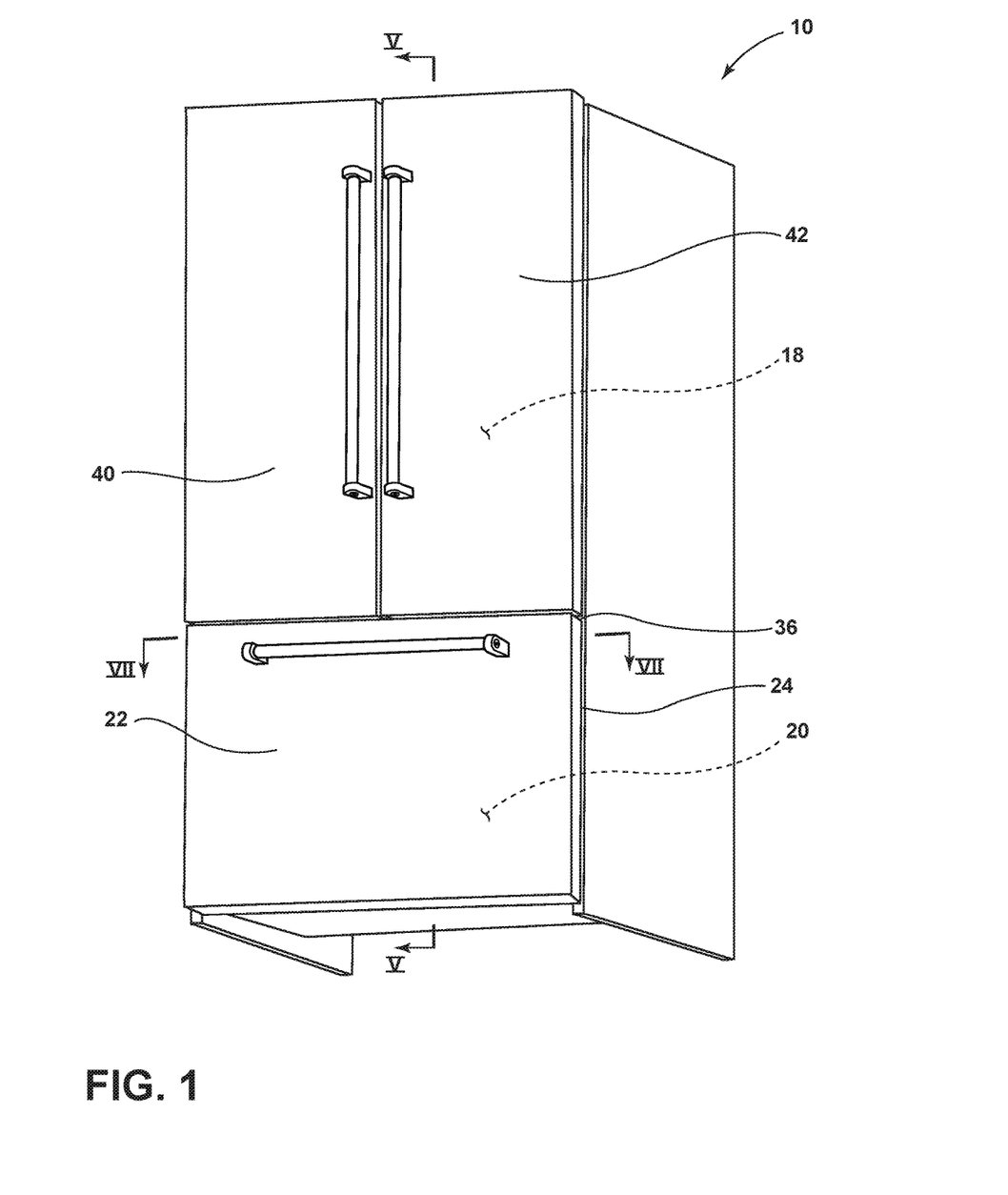
FIG. 1 is a front perspective view of a refrigeration appliance, according to one aspect.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-7, a refrigeration appliance 10 includes a wrapper 12 forming an exterior of the refrigeration appliance 10. The refrigeration appliance 10 further includes a refrigeration compartment liner 14 and a freezer compartment liner 16. The wrapper 12, the refrigeration compartment liner 14, and the freezer compartment liner 16 are in a spaced apart configuration forming a refrigeration compartment 18 and a freezer compartment 20. A door 22 is configured to provide access to and seal the freezer compartment 20. The door 22 has a seal 24 around a periphery thereof. A mullion 26 is disposed between the refrigeration compartment liner 14 and the freezer compartment liner 16. The mullion 26 includes a forward portion 28 extending towards the freezer compartment 20. The forward portion 28 includes at least one air-deflection surface 30. A fan 32 is operably coupled with an evaporator 34 and is configured to direct cooled air within the freezer compartment 20. The fan 32 is offset from the evaporator 34 and configured to direct air at the air-deflection surface 30.

Figure 2:
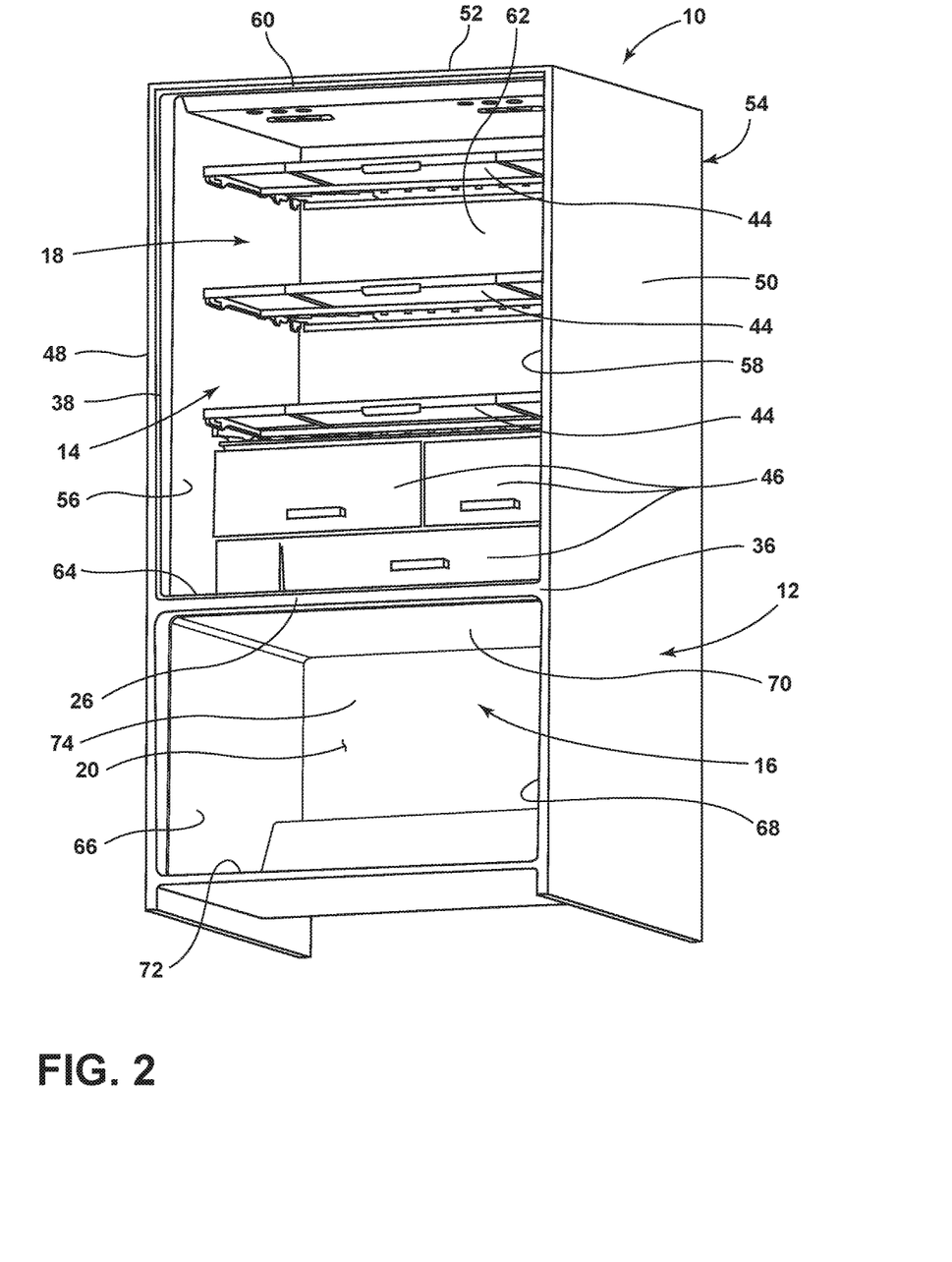
FIG. 2 is a front perspective view of the refrigeration appliance of FIG. 1 with one or more doors removed to reveal a refrigeration compartment and a freezer compartment, according to one aspect.

Referring now to FIG. 1, a refrigeration appliance 10 is shown having a front surface 36 that is generally disposed around a front opening 38 (FIG. 2) of a refrigeration compartment 18 (FIG. 2). The refrigeration compartment 18 is contemplated to be an insulated space for storing fresh food items having first and second doors 40, 42 that are rotatably coupled to the front surface 36 of the refrigeration compartment 18 for selectively providing access to the refrigeration compartment 18. In the embodiment shown in FIG. 1, a freezer door 22 is configured to selectively provide access to a freezer compartment 20 disposed below the refrigeration compartment 18. As illustrated, according to one embodiment, the freezer compartment 20 is arranged in a bottom mount configuration in the refrigeration compartment 18. Although the freezer compartment 20 is shown as the "bottom freezer" type, the teachings set forth herein are applicable to other types of cooling appliances, including but not limited to, side-by-side refrigerator/freezers, top mount freezers, etc. Accordingly, embodiments of the present disclosure are therefore not intended to be limited to any particular type and/or configuration of the refrigeration appliance 10.

Referring now to FIG. 2, the refrigeration appliance 10 is shown with the first and second doors 40, 42 and the freezer door 22 removed to reveal the refrigeration compartment 18 and the freezer compartment 20, which are separated by a mullion 26. In the embodiment of FIG. 2, a number of shelves 44 are shown disposed in the refrigeration compartment 18 and are contemplated to be vertically adjustable therein. The refrigeration compartment 18 also includes a number of drawers 46 for storing various items, such as fresh fruits and vegetables, in specific temperature controlled environments.

The refrigeration appliance 10 includes an exterior wrapper 12, which includes first and second side walls 48, 50, top wall 52 and rear wall 54. The exterior wrapper 12 may be a metal component formed of a sheet metal material, and/or any other practicable material.

The refrigeration appliance 10 further includes a refrigeration compartment liner 14, which includes first and second side walls 56, 58, top wall 60, rear wall 62 and bottom wall 64 that define the refrigeration compartment 18. The freezer compartment 20 includes a freezer compartment liner 16 having first and second side walls 66, 68, a top wall 70, a bottom wall 72, and a back wall 74. In some embodiments, the top wall 60 and/or bottom wall 64 of the refrigeration compartment 18 may be formed by the mullion 26 rather than the refrigeration compartment liner 14. Likewise, in some embodiments, the top wall 70 and/or bottom wall 72 of the freezer compartment 20 may be formed by the mullion 26 rather than the freezer compartment liner 16.

The refrigeration compartment liner 14 and freezer compartment liner 16 are spaced-apart from the exterior wrapper 12 to provide an insulating space therebetween. According to various examples, the refrigeration appliance 10 may include one or more vacuum insulated structures to aid in decreasing thermal conductivity between an interior and exterior of the appliance 10. In vacuum insulated structures, heat transmission through the vacuum insulated structure is decreased by creating a vacuum between the exterior walls of the structure. By creating a vacuum between the spaces intended to be thermally isolated, heat conduction is minimized because there is no, or less, material (e.g., air) to transfer the thermal energy between the thermally isolated spaces. For example, the wrapper 12 and the liners 14, 16 serve as the exterior and interior surfaces of the vacuum insulated structure, respectively. The wrapper 12 and the liners 14, 16 are configured in a spaced apart relationship to define a space therebetween. The space between the wrapper 12 and the liners 14, 16 may have an air pressure of less than about 1 atm, about 0.5 atm, about 0.4 atm, about 0.3 atm, about 0.2 atm, about 0.1 atm, or less than about 0.01 atm. The wrapper 12 and/or the liners 14, 16 may be composed of a metal (e.g., stainless steel), a polymer, any other practicable material, and/or combinations thereof.

Figure 3A:
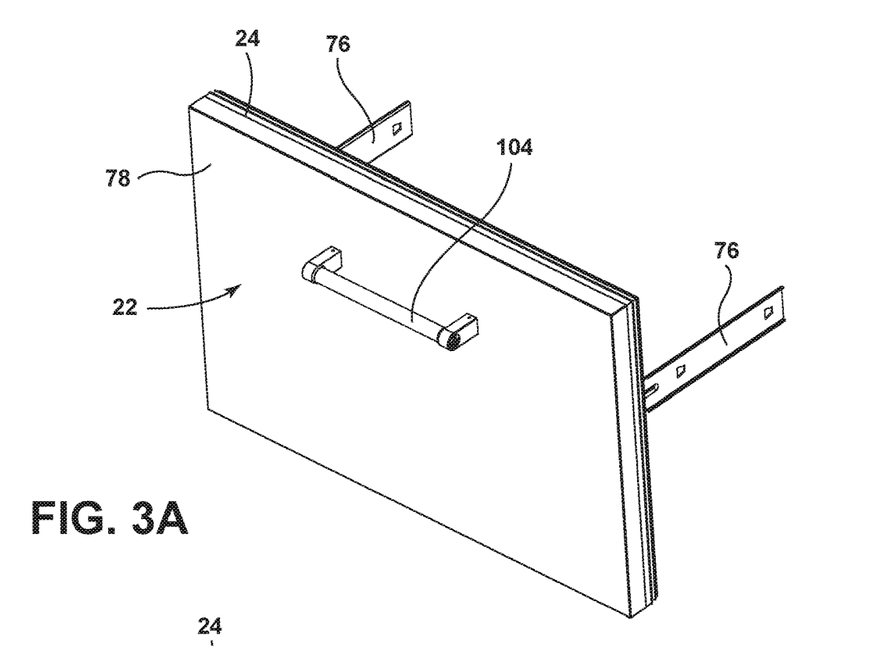
FIG. 3A is a front perspective view of a freezer door having a seal around a periphery of the door, according to one aspect.
Figure 3B:
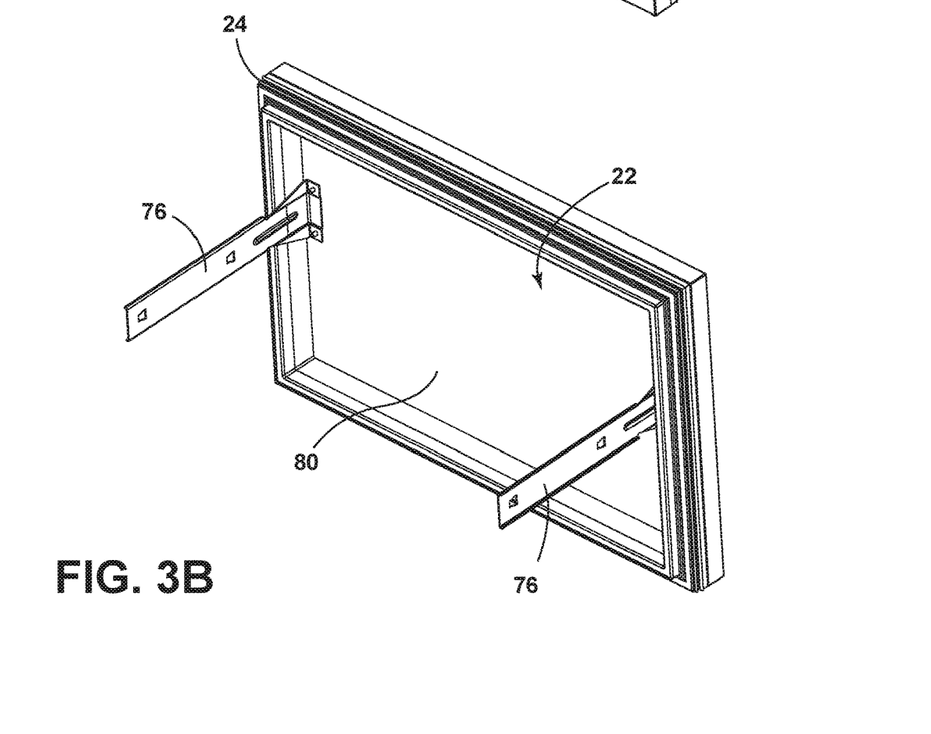
FIG. 3B is a rear perspective view of the door of FIG. 3A.

Referring to FIGS. 3A and 3B, the freezer compartment 20 is sealed through any type of closure known in the art. According to one embodiment, a two-piece door 22 is provided on a slidable assembly 76 that is coupled to the freezer compartment 20 (e.g., the freezer compartment liner 16) and/or any other portion of the refrigeration appliance 10. The slidable assembly 76 may move the door 22 between a first, closed position and a second, open position in conjunction with the use of a handle 104, or any other feature on the exterior of the refrigeration appliance 10. It will be appreciated, however, that the door 22 may be attached to any portion of the refrigeration appliance 10 through any means known in the art without departing from the teachings provided herein.

The door 22 includes an inner panel 78 and an outer panel 80 that are configured in a spaced apart relationship to define a space therebetween. The door 22, itself, may be a vacuum insulated structure, as explained above. In alternate embodiments, insulation may be provided between the inner and outer panels 78, 80, such that the door 22 is insulated. Alternatively, the door 22 may be formed from a single, integrally formed panel that is configured to insulate the freezer compartment 20.

A seal 24, or compressible gasket, is provided around the outer perimeter of the door 22. The seal 24 may be composed of a rubber, a polymeric material or any other soft and pliable material configured to create a seal between the door 22 and the front surface 36, or any other exterior portion of the refrigeration appliance 10. The seal 24 helps maintain the lower temperature of the freezer compartment 20, as compared to a higher temperature of the refrigeration compartment 18.

Referring to FIG. 4-7, the fan 32 is operably coupled with the evaporator 34, as will be described in greater detail below. The fan 32 may be a component of a fan module 92 that further includes a fan housing 110. The fan housing 110 may be made out of molded plastics, metals, and other types of substantially rigid materials. A fan wiring harness may be disposed within the housing 110 and may be in communication with the fan 32 and any additional electrical modules and/or other controls.

Referring still to FIGS. 4-7, the fan 32, according to one embodiment, is operably coupled with the evaporator 34 for drawing air from the freezer compartment 20 and passing that air through the evaporator 34. The fan module 92 includes the fan 32, a motor 108, a support bracket 110, and the fan housing 110. The motor 108 may be any fan motor having a drive shaft extending along a central longitudinal axis. The drive shaft, according to one embodiment, may be downwardly extending. A central hub of the fan 32 may define a central axis that is mounted to a drive shaft of the associated motor 108. In some instances, an axis of airflow from the fan 32 may be transverse to the central axis. The central hub of the fan 32 may be of any practicable shape and size to connect to a shaft extending from the motor 108. Any additional components, such as any fasteners or spacers, may be attached to the central hub of the fan 32 through any methods known in the art, such as, but not limited to, vibration welding or adhesives.

The motor 108 is mounted to the support bracket 110, which is mounted to a suitable support member (e.g., the back wall 74 of the freezer compartment liner 16 or a portion of the evaporator 34). In one embodiment, an electronically commutated (EC), a shaded pole, permanent split capacitor (PSC) motor, and/or any other type of motor known in the art is implemented. The motor 108 may also be a direct current (DC) motor with an electronic commutation control that makes the drive shaft rotate.

The fan housing 110 may partially encompass the fan 32 and may include an air outlet 112 on a forwardly portion of the housing 110. The air outlet 112 may include a grille 114 having one or more vanes 116 that may be orientated in any direction, including, but not limited to, a substantially vertical and/or a substantially horizontal orientation. The vanes 116 may direct airflow from the fan 32 in a desired direction and/or towards a predefined location. Accordingly, in operation, the fan 32 may direct airflow through the air outlet 112, and subsequently, the grille 114. The vanes 116 disposed in the grille 114 may further direct the airflow towards the side walls 66, 68, the mullion 26, and/or the air-deflection surface 30. The airflow directed towards the air deflection surface 30 may then be redirected by the air deflection surface 30 in a direction that prevents the airflow from the fan 32 from making direct contact with the seal 24 after leaving the air outlet 112 of the housing 110.

It is contemplated that the vanes 116 may direct air in any direction without departing from the teachings provided herein. Moreover, the vanes 116 may be fixedly attached, or integrally formed, with the fan housing 110. Alternatively, some or all of the vanes 116 may be reconfigurable to redirect the airflow in one or more desired directions.

Figure 4:
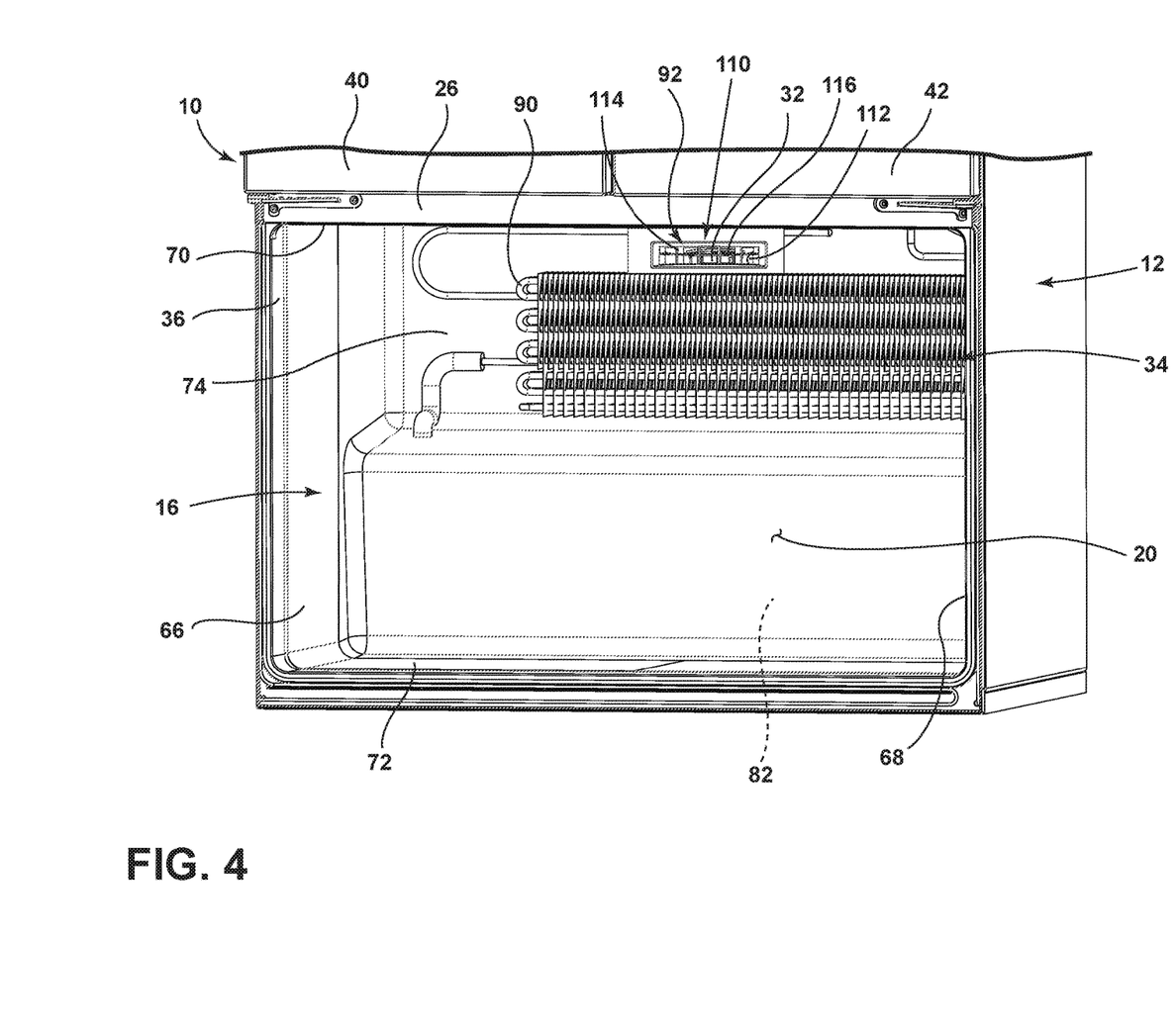
FIG. 4 is a front perspective view of the freezer compartment having a fan and an evaporator in the freezer compartment with the freezer door removed, according to one aspect.

With further reference to FIG. 4, the fan 32 has a plurality of blades disposed circumferentially at spaced intervals about the central hub. For example, four blades are disposed at spaced intervals of ninety (90) degrees about the circumference of the central hub. The fan blades may be of any practicable shape, such as a teardrop shape.

Figure 5:
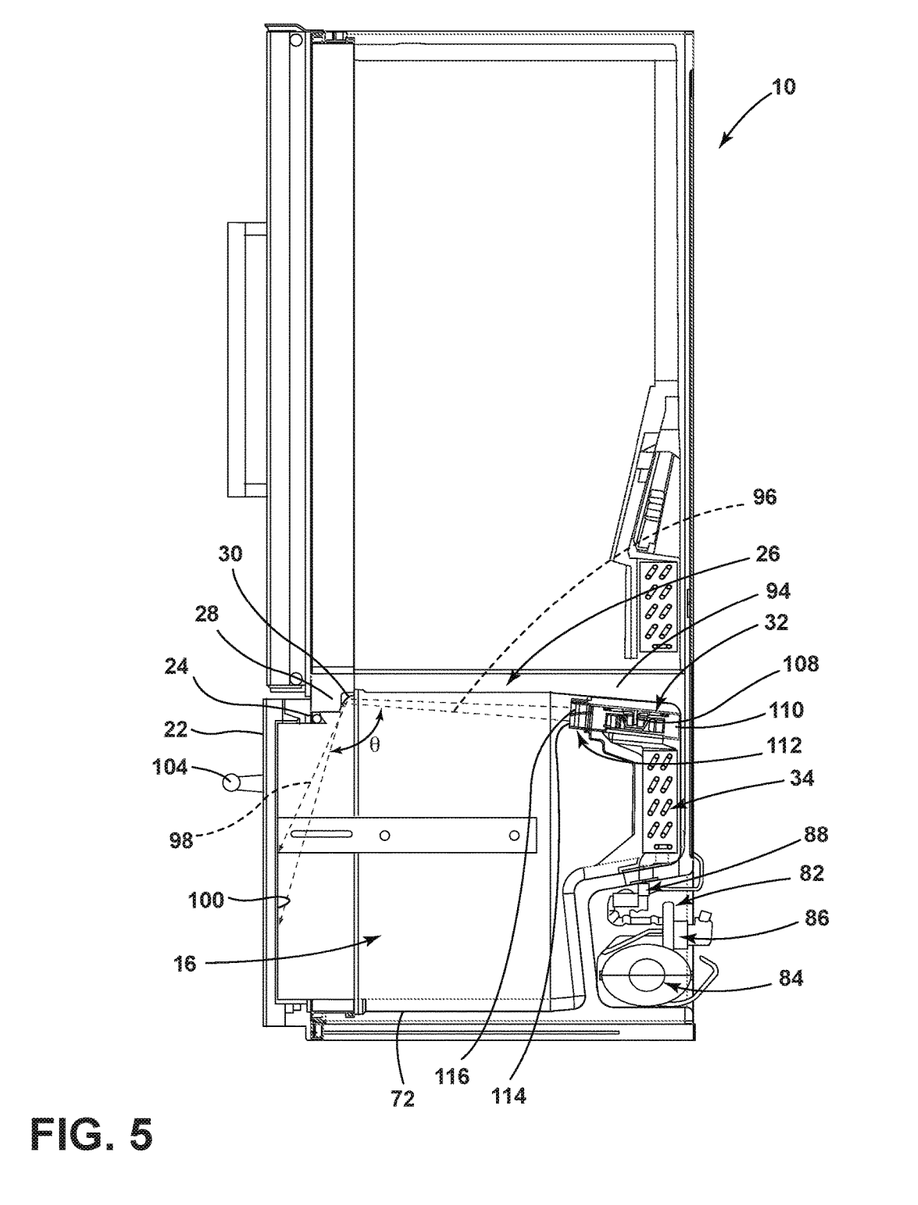
FIG. 5 is a cross-sectional view of the refrigeration appliance taken along the line V-V of FIG. 1, according to one aspect.

Referring to FIG. 5, the refrigeration appliance 10 includes a machinery compartment 82 that at least partially contains components for executing a known vapor compression cycle for cooling air in the refrigeration compartment 18 and/or the freezer compartment 20. The components include a compressor 84, a condenser 86, an expansion device 88, and the evaporator 34, which includes an evaporator coil 90, connected in series and charged with a refrigerant. The evaporator 34 is a type of heat exchanger that transfers heat from air passing over the evaporator 34 to a refrigerant flowing through the evaporator 34, thereby causing the refrigerant to vaporize. The cooled air is used to refrigerate one or more refrigeration compartment(s) 18 and/or freezer compartment(s) 20 via the fan 32. The refrigeration compartment 18 and the freezer compartment 20 may share one or more components for executing the compression cycle. Alternatively, each compartment 18, 20 within the refrigeration appliance 10 may include its own dedicated components.

In the embodiment shown in FIG. 5, the fan 32 is disposed above the evaporator 34. The evaporator 34 is configured to provide cooled air to the freezer compartment 20. The fan 32, as illustrated, is at an offset angle from the evaporator 34 such that the fan 32 directs airflow towards the top surface of the freezer compartment 20, as will be described in great detail below. According to one aspect, an angle between an axis of airflow of the fan 32 and the freezer compartment liner 16 is between one (1) degree and eighty-nine (89) degrees. The evaporator 34 may be disposed in a substantially parallel position to the back wall 74 of the freezer compartment liner 16.

The mullion 26 is integrally formed with, or attached to, the top surface of the freezer compartment 20 and includes a laterally extending portion 94 and the forward portion 28 that extends downwardly from the laterally extending portion 94. The downwardly extending forward portion 28 includes the air-deflection surface 30. The air-deflection surface 30 may include one or more curved surfaces, as will be described in greater detail below. The air-deflection surface 30 may also or alternatively include one or more planar surfaces. The air-deflection surface 30 may be configured to redirect airflow from the fan 32 from a first direction 96 to a second direction 98. According to at least one embodiment, the first direction 96 is substantially forwardly and the second direction 98 is a mixture of downwardly and/or forwardly. According to one embodiment, the second direction 98 may be offset from the first direction 96 by an offset angle $\theta$ between ten (10) degrees and one hundred and eighty (180) degrees. In some embodiments, the offset angle $\theta$ may be greater than hundred and eighty (180) degrees.

Accordingly, it is contemplated that a portion of the airflow will be redirected away from the seal 24 surrounding the door 22 prior to contacting the seal 24. The redirected airflow may instead contact an inner surface 100 of the door 22 and/or the bottom wall 72 of the freezer compartment 20. Accordingly, as a result of the airflow from the fan 32 coming into direct contact with the air-deflection surface 30 rather than the seal 24, the air-deflection surface 30 may have a lower temperature than an inner surface of the seal 24. Consequently, under most conditions, the seal 24 will remain at temperatures above the dew point of ambient air that surrounds the refrigeration appliance 10. Thus, the seal 24 may be free of condensation and frost build up. By minimizing condensation buildup on the seal 24, electrical requirements of the refrigeration appliance 10 may be substantially reduced over conventional freezer assemblies.

Figure 6:
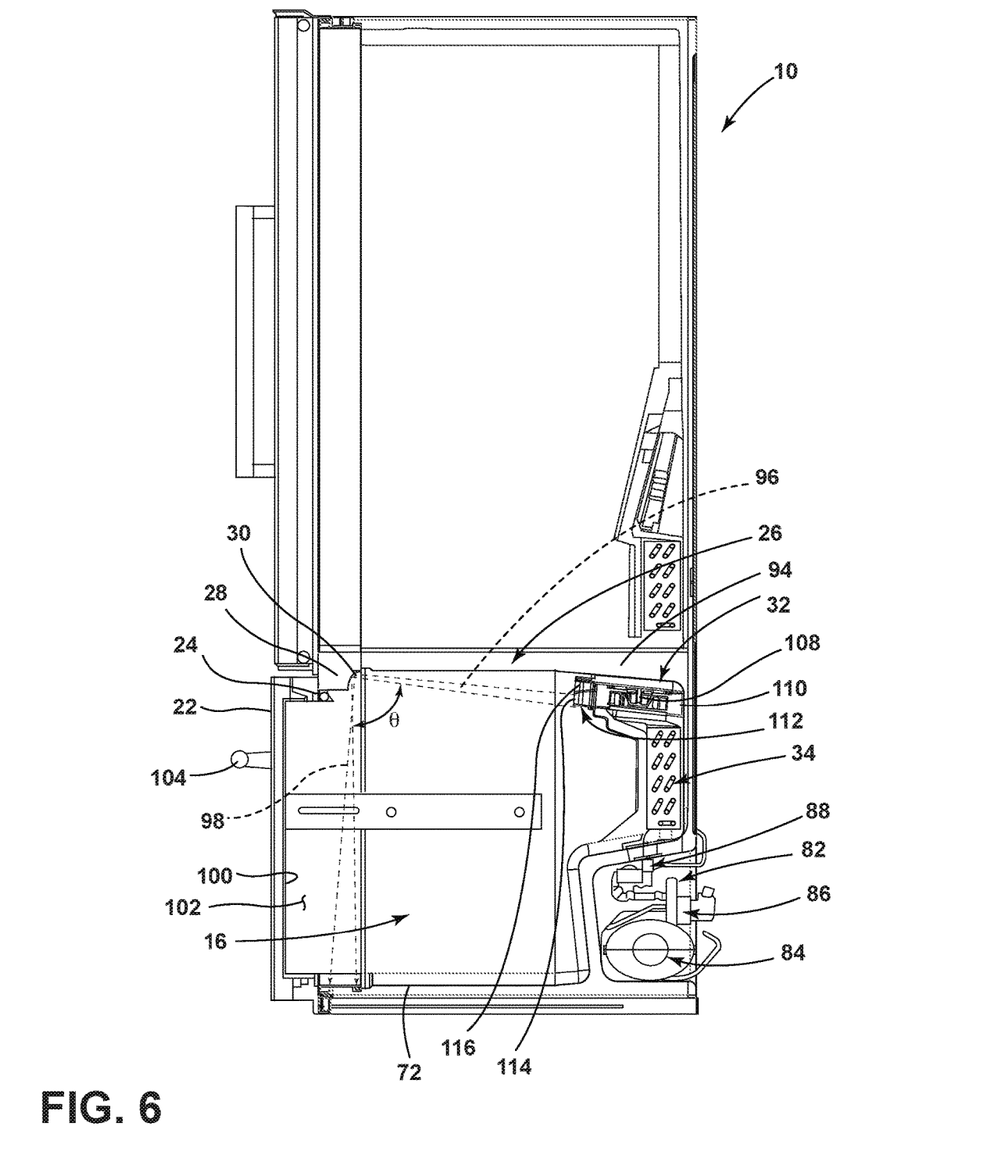
FIG. 6 is a cross-sectional view of the refrigeration appliance taken along the line V-V of FIG. 1 illustrating another aspect.

Referring to FIG. 6, according to at least one embodiment, the air-deflection surface 30 is configured such that airflow from the fan 32 contacts the air-deflection surface 30 and is redirected towards the bottom wall 72 of the freezer compartment 20. Thus, the assembly, as described herein, redirects the cooled air from the first direction 96 to the second direction 98, to form an air curtain along a front portion 102 of the freezer compartment 20. It is further contemplated that the air curtain may be provided for accelerated air flow when the door 22 is opened in order to keep cooled air within the freezer compartment 20 while a user keeps the door 22 in an open position. Accordingly, leakage of the cooled air through the opening of the freezing compartment 20 is partially prevented, so that temperatures in the freezing compartment 20 do not rise as quickly, or in a significant amount, when the door 22 is placed in the second position, thereby enhancing the cooling efficiency of the refrigeration appliance 10.

Figure 7:
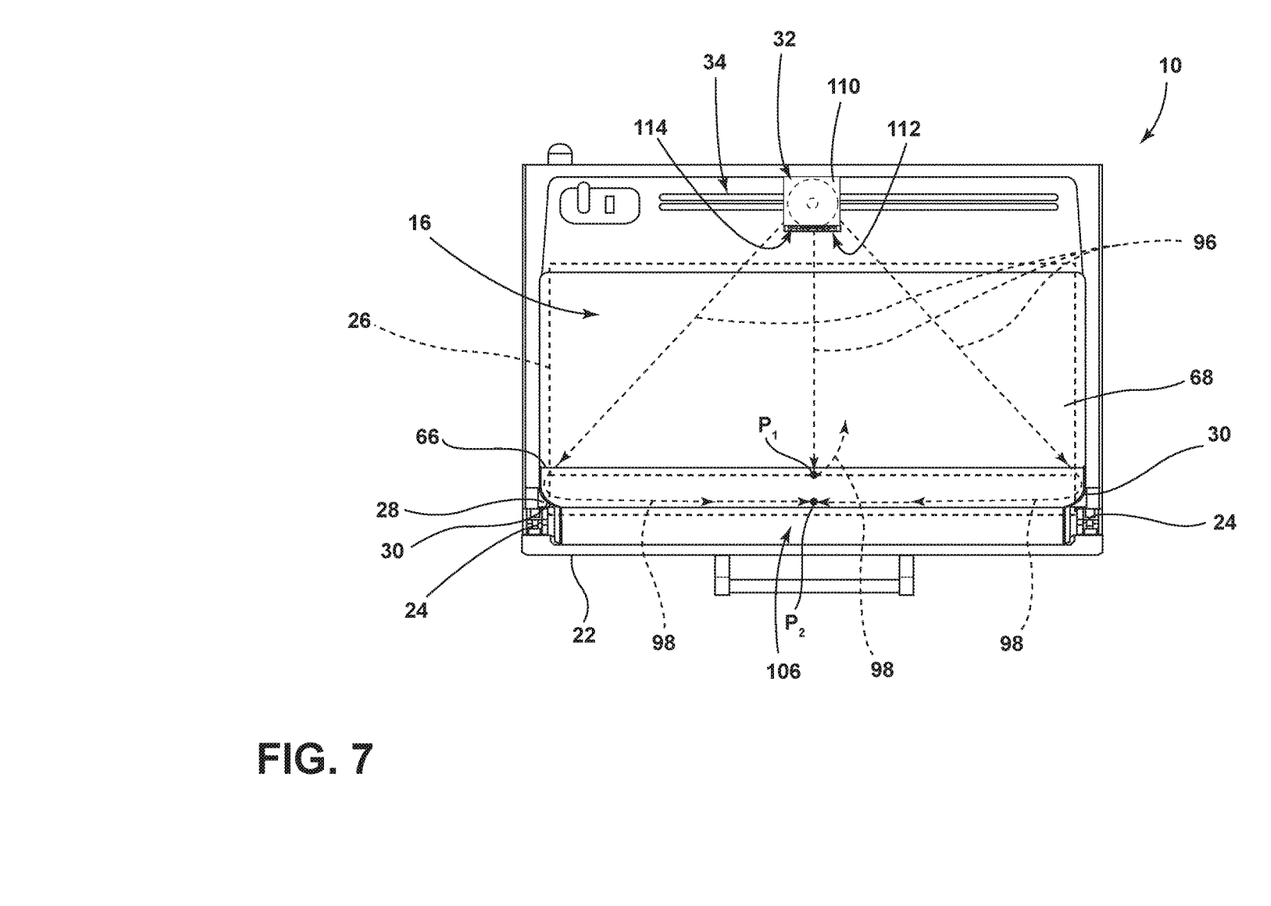
FIG. 7 is a cross-sectional view of the refrigeration appliance taken along the line VII-VII of FIG. 1, according to one aspect.

Referring now to FIG. 7, the opposing side walls 66, 68 of the freezer compartment 20 may additionally, or alternatively, include air-deflection surfaces 30 on a portion thereof such that airflow that is directed at and/or along the side walls 66, 68 is further redirected towards a central portion 106 of the freezer compartment 20. As described above, the air-deflection surfaces 30 may prevent some of the airflow from directly contacting the seal 24, thereby reducing the condensation on the seal 24.

Moreover, a first air curtain may be formed by the air-deflection surface 30 on the mullion 26 and a second, and in some embodiments, a third, air curtain may be formed by one or more of the side walls 66, 68. The airflow that is redirected by the air-deflection surface 30 on the mullion 26 may be offset from the airflow that is redirected by the one or more air-deflection surfaces 30 on the side walls 66, 68. For example, the air-deflection surface 30 of the mullion 26 may be direct airflow towards a point $P_1$ that is offset, vertically and/or laterally, from the airflow from the one or more air-deflection surfaces 30 of the side walls 66, 68, which may be directed towards a second point $P_2$.

The freezer compartment 20 having at least one air deflecting surface may enhance the sealing abilities of the seal 24 by minimizing condensation thereon that is formed when the seal 24 is in a direct path with the cold air distributed by the fan 32 within the freezer compartment 20. By improving the sealing ability of the seal 24, the refrigeration appliance's 10 energy efficiency and perceived quality may also be enhanced.

The freezer compartment 20 may also afford more comprehensive circulation patterns, which may create a more uniform temperature within the freezer compartment 20 whether or not the freezer compartment 20 is empty, loaded, and/or partially loaded. When the freezer compartment 20 is in a lightly loaded condition, improved airflow circulation patterns provided by the assembly set forth herein allows air to flow around items, cooling the freezer compartment 20 and reducing the possibility of stagnant air. When the freezer compartment 20 is in a heavily loaded condition, the assembly set forth herein forces air to flow over the items in the freezer compartment 20, which continues to circulate air throughout freezer compartment 20.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A refrigeration appliance, comprising:
    a wrapper forming an exterior of said refrigeration appliance;
    a refrigeration compartment liner and a freezer compartment liner, wherein the wrapper, the refrigeration compartment liner, and the freezer compartment liner are in a spaced apart configuration forming a refrigeration compartment and a freezer compartment, and further wherein the freezer liner includes first and second sidewalls, a top wall, a bottom wall, and a back wall;
    a door configured to provide access to and seal the freezer compartment;
    a seal around a periphery of the door, the periphery of the door including an upper edge;
    a mullion disposed between the refrigeration compartment liner and the freezer compartment liner, wherein the mullion includes a forward portion extending towards the freezer compartment, the forward portion including a front surface abutting the upper edge of the door when the door is in a closed position and at least one air-deflection surface on an opposing side of the forward portion from the front surface;

an evaporator; and, a fan operably coupled with the evaporator and configured to direct cooled air across an upper portion of the freezer compartment and along the top wall of the freezer liner, wherein the top wall of the freezer liner is exposed to the interior of the freezer compartment, and further wherein the fan is offset from the evaporator and configured to direct air towards the top wall of the freezer liner and at the air-deflection surface.

2. The refrigeration appliance of claim 1, wherein the at least one air-deflection surface is positioned within the freezer compartment and so as to deflect air directed by the fan away from direct contact with the seal.

3. The refrigeration appliance of claim 1, wherein the forward portion extends inwardly into the freezer compartment past the extent to which the seal extends into the freezer compartment.

4. The refrigeration appliance of claim 1, wherein the fan is disposed within a fan housing that includes an air outlet.

5. The refrigeration appliance of claim 1, wherein the air outlet includes grille, the grille having one or more vanes for directing the cooled air towards the air-deflection surface.

6. The refrigeration appliance of claim 1, wherein the air-deflection surface configured for redirecting air from the fan from a first direction to a second direction, the second direction enabling contact with a central portion of the door.

7. A freezer compartment for a refrigeration appliance, comprising:

a wrapper forming an exterior of the refrigeration appliance;

a liner disposed in a spaced apart configuration relative to the wrapper, the liner having first and second sidewalls, a top wall, a bottom wall, and a back wall;

a door configured to provide access to and seal the freezer compartment;

a seal disposed around a periphery of the door;

an evaporator;

a fan positioned within the freezer compartment at the back wall of the liner and positioned at an offset angle from the evaporator; and a mullion attached to the liner and including a forward portion, the forward portion extending from the top wall toward the bottom wall and including at least one air-deflection surface, wherein the at least one air-deflection surface is laterally positioned between the seal and the fan, and further wherein the fan is configured to direct air towards the top wall of the freezer compartment and the air-deflection surface, the top wall defining a top wall of the freezer compartment.

8. The freezer compartment for a refrigeration appliance of claim 7, wherein the air-deflection surface is a curved surface.

9. The freezer compartment for a refrigeration appliance of claim 7, wherein the air-deflection surface is configured to redirect air from the fan away from the seal.

10. The freezer compartment for a refrigeration appliance of claim 7, wherein the air-deflection surface is configured to redirect airflow from the fan towards a bottom wall of the freezer compartment.

11. The freezer compartment for a refrigeration appliance of claim 7, wherein the fan is disposed within a fan housing that includes an air outlet.

12. The freezer compartment for a refrigeration appliance of claim 11, wherein the fan housing includes a grille, the grille having one or more vanes for directing the cooled air towards the air-deflection surface.

13. A refrigeration appliance, comprising:

a wrapper forming an exterior of the refrigeration appliance;

a liner disposed in a spaced apart configuration from the wrapper, the liner defining a refrigeration compartment;

a door configured to provide access to and seal the refrigeration compartment;

a seal disposed around a periphery of the door, the periphery including an upper edge;

a fan; and, at least one air-deflection surface extending inwardly from the seal toward a back wall of the liner and configured to redirect airflow from the fan, wherein the fan is positioned to direct airflow at the air-deflection surface and into the refrigeration compartment from the back wall of the liner, the fan further being positioned at an angle allowing the airflow to be directed into contact with a top wall of the refrigeration compartment.

14. The refrigeration appliance of claim 13, wherein the air-deflection surface is integrally formed with a side wall of the liner.

15. The refrigeration appliance of claim 13, wherein the air-deflection surface is integrally formed with a mullion that is disposed between the refrigeration compartment and a freezer compartment.

16. The refrigeration appliance of claim 13, wherein the fan is disposed within a fan housing that includes an air outlet.

17. The refrigeration appliance of claim 16, wherein the fan housing includes a grille, the grille having one or more vanes for directing the cooled air towards the air-deflection surface.

18. The refrigeration appliance of any of claim 13, wherein the air-deflection surface has a colder surface temperature than an inner surface of the seal.

* * * * *